United States Patent [19]
Yoshio et al.

[11] Patent Number: 5,216,652
[45] Date of Patent: Jun. 1, 1993

[54] LIGHT SPOT POSITION DETECTOR

[75] Inventors: Junichi Yoshio; Yoshitaka Shimoda, both of Tokorozawa, Japan

[73] Assignee: Pioneer Electronic Corporation, Tokyo, Japan

[21] Appl. No.: 824,600

[22] Filed: Jan. 23, 1992

[30] Foreign Application Priority Data

Jan. 30, 1991 [JP] Japan .................................. 3-009957

[51] Int. Cl.$^5$ .............................................. G11B 7/09
[52] U.S. Cl. ................... 369/44.37; 369/44.41
[58] Field of Search ............... 369/44.26, 44.28–44.38, 369/44.41, 44.42

[56] References Cited

U.S. PATENT DOCUMENTS

| | | | |
|---|---|---|---|
| 4,787,076 | 11/1988 | Deguchi et al. | 369/44.34 |
| 5,090,004 | 2/1992 | Ohsato et al. | 369/44.37 |
| 5,140,577 | 8/1992 | Ohsato | 369/44.37 |
| 5,148,424 | 9/1992 | Wachi | 369/44.37 |
| 5,155,717 | 10/1992 | Bakx | 369/44.41 X |
| 5,159,589 | 10/1992 | Ohsato | 369/44.41 X |

FOREIGN PATENT DOCUMENTS

| | | |
|---|---|---|
| 0324949 | 7/1989 | European Pat. Off. . |
| 0392775 | 10/1990 | European Pat. Off. . |
| 0426879 | 5/1991 | European Pat. Off. . |

OTHER PUBLICATIONS

Patent Abstracts of Japan, vol. 9, No. 334 (P-417), Dec. 27, 1985, & JP60-157737.
Patent Abstracts of Japan, vol. 13, No. 253 (P-883), Jun. 13, 1989 & JP10-50243.

*Primary Examiner*—W. R. Young
*Attorney, Agent, or Firm*—Kane, Dalsimer, Sullivan, Kurucz, Levy, Eisele and Richard

[57] ABSTRACT

A light spot position detector reliably effects spot-on-track detection even if the reflectivities of recording tracks and intertrack areas of an optical disk are substantially the same as each other. A tracking error signal used to control a scanning spot applied to the recording tracks on the optical disk is produced by mixing light spot position signals that are generated according to the three beam method and the push pull method from light beams reflected from light spots on the signal recording surface of the optical disk.

9 Claims, 15 Drawing Sheets

F I G.4
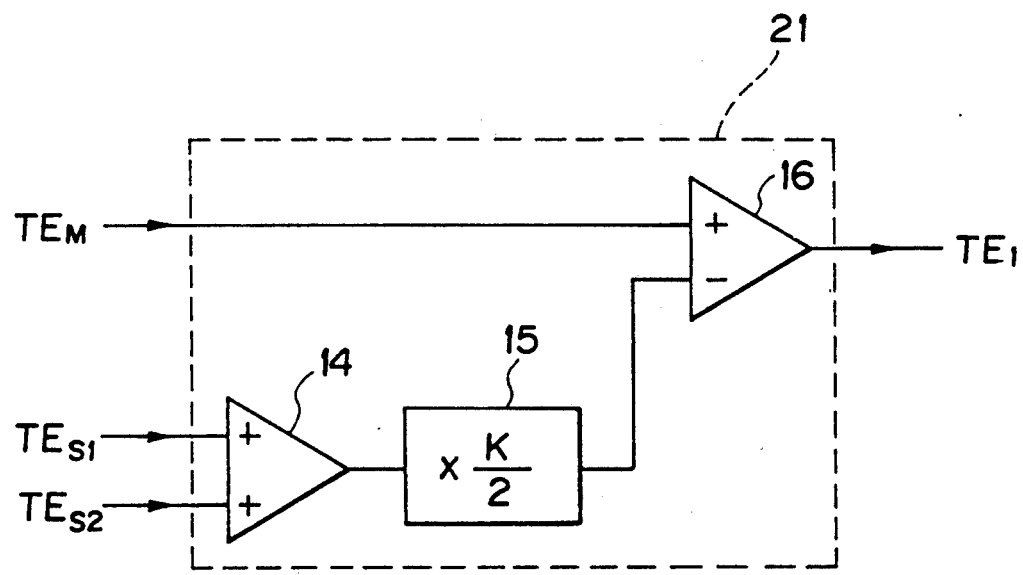

FIG.10(A)
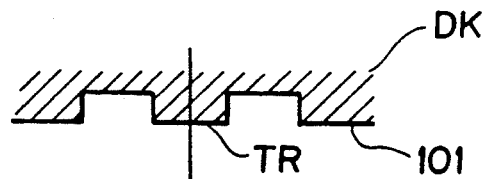
FIG.10(B)
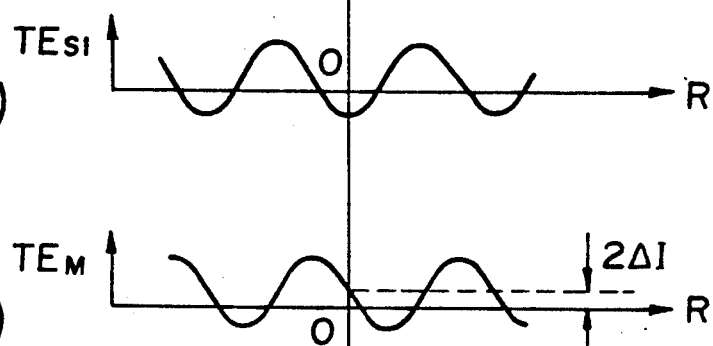
FIG.10(C)
FIG.10(D)
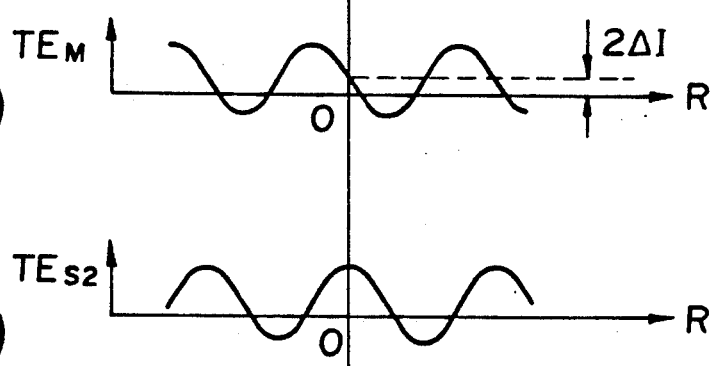
FIG.10(E)
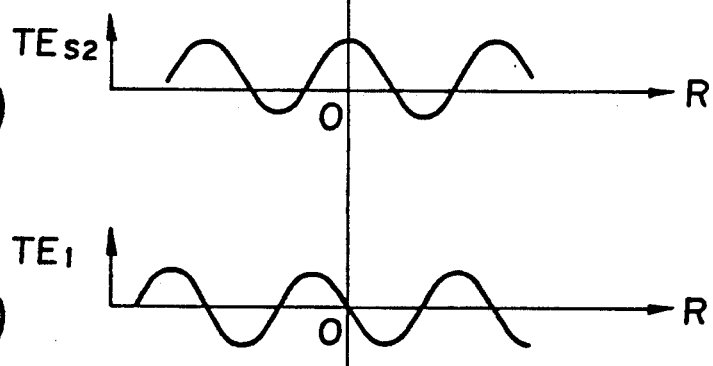
FIG.10(F)
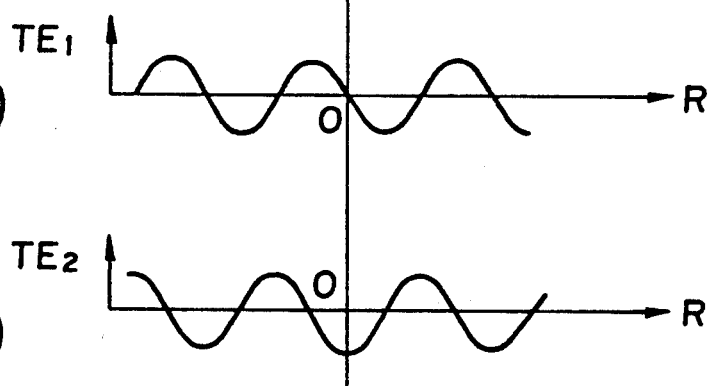

200~# LIGHT SPOT POSITION DETECTOR

BACKGROUND OF THE INVENTION

The present invention relates to a light spot position detector, and more particularly to a light spot position detector for use in tracking servo control or track jump control with respect to an optical memory disk (OMD).

Heretofore, various tracking control methods have been developed for use with read only optical disks such as compact discs. Generally, it has been customary to detect whether a beam spot for reading recorded information is present on the central axis of a recording track of the optical memory disk according to the three beam method or the push-pull method (spot-on-track detection).

In the three beam method, two satellite spots, i.e., leading and trailing spots, are projected onto the optical disc at positions forward and rearward, respectively, of a main scanning spot for reading recorded information from a recording track. The leading and trailing spots are spaced radially from each other by a certain offset in a direction normal to the track direction, i.e., the axis (center line) of the recording track, along which the main scanning spot travels. Reflected beams from the leading and trailing spots on the optical memory disk are detected by respective photodetectors, and the difference between photoelectrically converted output signals from the photodetectors is calculated and produced as a differential output signal or tracking error signal. When the main scanning spot exists on the axis of the recording track, the differential output signal is of a zero value. However, when the main scanning spot is displaced from the axis of the recording track, the differential output signal is of a positive or negative value. An actuator actuates an objective lens of an optical pickup to control the position of the spots on the optical disc according to a tracking servo control process so that the differential output signal becomes zero. The position of the spots can also be controlled in a track jump control process by counting zero crossings where the differential output signal becomes zero.

The spot-on-track detection is possible according to the three beam method in case that the optical memory disk is a read-only optical memory disk. More specifically, the read only optical disc has recording tracks that are composed of pits representing information signals, and the intensity of light reflected from these pits is less than the intensity of light reflected from mirror-finish areas. Consequently, the differential output signal is not zero if the main scanning spot is off track.

In this three beam method, there is an advantageous effect that even if the beams are moved on the disk due to the inclination of the disk, an offset does not occur in a tracking error signal obtained by the method.

There are known WORM (Write Once Read Many) optical memory disks and E-DRAW (Erasable Direct Read After Write) optical memory disks. These optical memory disks have an unrecorded region that includes tracks (often referred to as grooves) where information is to be recorded subsequently and intertrack areas other than the tracks. In the unrecorded region, the intensity of light reflected from these tracks and the intensity of light reflected from the intertrack areas are almost the same as each other, i.e., there is not substantial radial contrast between the tracks and the intertrack areas. Therefore, it is highly difficult to effect the spot-on-track detection in the unrecorded region according to the three beam method since the differential output signal is zero regardless of whether the main scanning spot is on track or off track.

The push pull method, which is effective to carry out the spot-on-track detection on such WORM and E-DRAW optical memory disks, employs a two-segment photodetector or two photodetector halves. When a light beam is applied as a scanning spot to an optical memory disk, it is reflected as light of a zeroth-order and light of positive-and negative-first-orders due to an irregular disk surface configuration that is composed of a recording track (groove) and an intertrack area other than the recording track. The reflected light is applied to the two photodetector halves in three areas, i.e., the first area where the zeroth-order light is applied, the second area where the zeroth-order light and the positive-first-order light are applied as diffracted, and the third area where the zeroth-order light and the negative-first-order light are applied as diffracted.

The two photodetector halves have respective photodetector surfaces whose output terminals are connected to the respective input terminals of a subtracter, which produces a differential output signal or tracking error signal representative of the difference between output signals from the photodetector halves. When the scanning spot is on track, the intensity of light applied to the second area and the intensity of light applied to the third area are equal to each other, and hence the differential output signal is zero. When the scanning spot is off track, the intensity of light applied to the second area and the intensity of light applied to the third area are different from each other, and hence the differential output signal is of a positive or negative value. Consequently, the push pull method is capable of carrying out the spot-on-track detection in a manner similar to the three beam method.

However, if the optical memory disk is radially inclined or the lens of the optical system in the optical pickup is displaced off the optical axis, then a light spot offset occurs on the photodetector according to the push pull method. With the light spot offset, even when the scanning spot is right on the axis of the recording track, the produced tracking error signal is not zero, and the tracking servo control process is not properly performed.

SUMMARY OF THE INVENTION

It is an object of the present invention to provide a light spot position detector which is capable of reliably effecting spot-on-track detection even if the reflectivities of recording tracks or grooves and intertrack areas of an optical memory disk are substantially the same as each other.

According to the present invention, there is provided a light spot position detector for detecting whether a light spot is present on the center line of a recording track or not based on a light beam reflected from a signal recording surface of an optical disk, the light spot position detector comprising a light-emitting unit for applying, to the signal recording surface of the optical disk, a first light spot, a second light spot spaced forwardly from the first light spot by a distance along the center line of the recording track and spaced radially from the first light spot by a distance in a direction perpendicular to the center line of the recording track, and a third light spot spaced rearwardly from the first light spot by the first distance along the center line of the recording track and spaced radially from the first light spot by a distance in a direction perpendicular to the center line of the recording track, a first photodetector having two divided photodetector surfaces, for photoelectrically converting a light beam reflected from the first light spot into an electric signal, a second photodetector having two divided photodetector surfaces, for photoelectrically converting a light beam reflected from the second light spot into an electric signal, a third photodetector means having two divided photodetector surfaces, for photoelectrically converting a light beam reflected from the third light spot into an electric signal, a processing unit for calculating a first differential output signal representing a difference between output signals from the photodetector surfaces of the first photodetector, calculating a second differential output signal representing a difference between output signals from the photodetector surfaces of the second photodetector means, calculating a third differential output signal representing a difference between output signals from the photodetector surfaces of the third photodetector, producing a first light spot position signal representing a difference between a multiple of the sum of the second and third differential output signals and a real number, and the first differential output signal, producing a second light spot position signal representing a difference between the second and third differential output signals, calculating a second sum output signal representing the sum of the output signals from the photodetector surfaces of the second photodetector, calculating a third sum output signal representing the sum of the output signals from the photodetector surfaces of the third photodetector, and producing a third light spot position signal representing a difference between the second and third sum output signals, and a mixing unit for mixing the first and second light spot position signals with each other.

The processing unit may comprise a first subtracter for calculating a difference between the output signals from the photodetector surfaces of the first photodetector thereby to produce the first differential output signal, a second subtracter for calculating a difference between the output signals from the photodetector surfaces of the second photodetector thereby to produce the second differential output signal, a third subtracter for calculating a difference between the output signals from the photodetector surfaces of the third photodetector thereby to produce the third differential output signal, a first adder for calculating the sum of the second differential output signal from the second subtracter and the third differential output signal from the third subtracter, a multiplier for multiplying the sum calculated by the first adder by a real number, a fourth subtracter for calculating a difference between an output signal from the multiplier and the first differential output signal thereby to produce the first light spot position signal, a fifth subtracter for calculating a difference between the second differential output signal from the second subtracter and the third differential output signal from the third subtracter thereby to produce the second light spot position signal, a second adder for adding the output signals from the photodetector surfaces of the second photodetector means thereby to produce the second sum output signal, a third adder for adding the output signals from the photodetector surfaces of the third photodetector thereby to produce the third sum output signal, and a sixth subtracter for calculating a difference between the second and third sum output signals thereby to produce the third light spot position signal.

The first photodetector has first and second photodetector surfaces as the photodetector surfaces, respectively, thereof, the second photodetector has third and fourth photodetector surfaces as the photodetector surfaces, respectively, thereof, and the third photodetector has fifth and sixth photodetector surfaces as the photodetector surfaces, respectively, thereof, the arrangement being such that the first subtracter produces the first differential output signal by subtracting the output signal from the second photodetector surface from the output signal from the first photodetector surface, the second subtracter produces the second differential output signal by subtracting the output signal from the fourth photodetector surface from the output signal from the third photodetector surface, the third subtracter produces the third differential output signal by subtracting the output signal from the sixth photodetector surface from the output signal from the fifth photodetector surface, and the fifth subtracter produces the second light spot position signal by subtracting the third differential output signal from the second differential output signal.

Alternatively, the first photodetector has first and second photodetector surfaces as the photodetector surfaces, respectively, thereof, the second photodetector means has third and fourth photodetector surfaces as the photodetector surfaces, respectively, thereof, and the third photodetector has fifth and sixth photodetector surfaces as the photodetector surfaces, respectively, thereof, the arrangement being such that the first subtracter produces the first differential output signal by subtracting the output signal from the first photodetector surface from the output signal from the second photodetector surface, the second subtracter produces the second differential output signal by subtracting the output signal from the third photodetector surface from the output signal from the fourth photodetector surface, the third subtracter produces the third differential output signal by subtracting the output signal from the fifth photodetector surface from the output signal from the sixth photodetector surface, and the fifth subtracter produces the second light spot position signal by subtracting the second differential output signal from the third differential output signal.

The sixth subtracter produces the third light spot position signal by subtracting the third sum output signal from the second sum output signal.

Alternatively, the sixth subtracter produces the third light spot position signal by subtracting the second sum output signal from the third sum output signal.

The distance in the radial direction of the disk between two spots is approximately a quarter of the interaxial distance between adjacent tracks on the optical disk.

The light spot position detector according to the present invention offers both the advantages of the first light spot position signal that is calculated from the three push pull output signals according to the push pull method, and the third light spot position signal that is produced as a tracking error signal according to the three beam method.

More specifically, the first light spot position signal cancels out spot offsets produced in the push pull output signals due to a lens offset or a disk inclination. Though each of the push pull output signals is affected by the spot offset, since the spot offsets are canceled out by the first light spot position signal, the first light spot position signal is effective to carry out the spot-on-track detection even if there is no substantial radial contrast between the tracks and the intertrack areas. The third light spot position signal is ineffective to perform the spot-on-track detection if there is no substantial radial contrast. However, the third light spot position signal is not affected by the spot offset as it is not produced according to the push pull method.

Consequently, an accurate tracking servo process can be performed based on a tracking error signal that is produced by mixing the first and third light spot position signals at a suitable ratio. Therefore, the spot-on-track detection can be performed without fail even in an unrecorded region of the optical memory disk, particularly even if the reflectivities of recording tracks or grooves and intertrack areas of the optical memory disk are substantially the same as each other.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

In the accompanying drawings:

FIG. 4 is a detailed block diagram of a light spot position detecting circuit in the light spot position detector shown in FIG. 2;

FIG. 10(A-F) is a diagram illustrating the manner in which the light spot position detector shown in FIG. 8 operates;

DETAILED DESCRIPTION OF PREFERRED EMBODIMENTS

Prior to the description of the embodiments of the present invention, the problems of conventional processes for detecting a scanning spot on an optical memory disk will first be described in detail with reference to the drawings.

Figure 5:
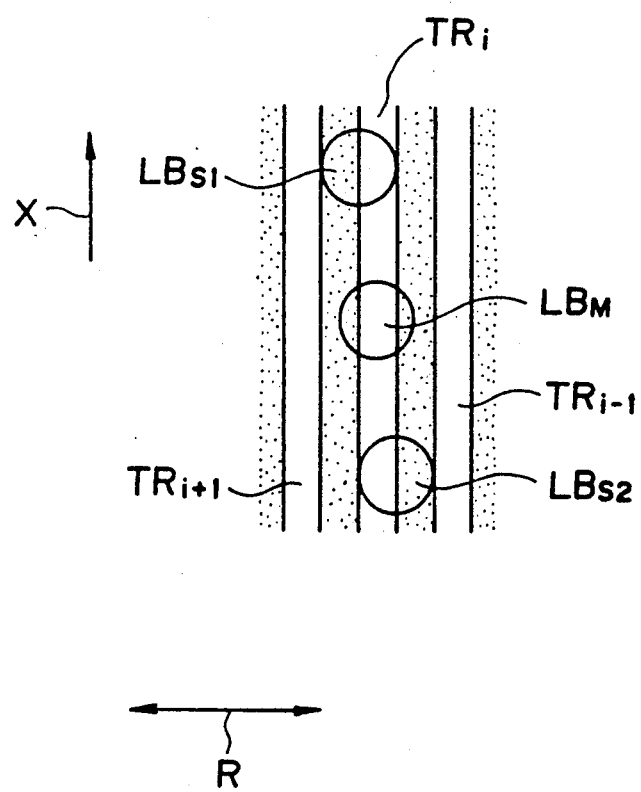
FIG. 5, 6(A-F) and 7(A-D) are diagrams illustrating a manner in which the light spot position detector shown in FIG. 2 operates, respectively.

As described above, a spot-on-track detection is possible according to the three beam method insofar as the optical memory disk is a read only optical memory disk. More specifically, as shown in FIG. 5, a read only optical disc has recording tracks TR (blank area) that are composed of pits representing information signals, and the intensity of light reflected from these pits is less than the intensity of light reflected from mirror-finished areas (stippled area). There is a radial contrast between the recording tracks and the intertrack mirror-finished areas. Consequently, the differential output signal is not zero if the main scanning spot is off track (refer to two curves 1 and 3 in FIG. 15(B)).

Figure 15A:
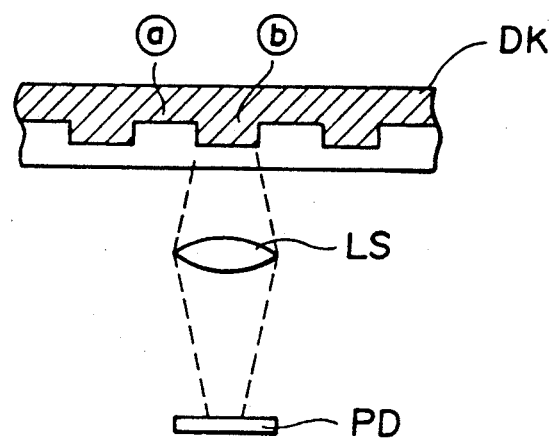
FIGS. 15(A) and 15(B) are diagrams illustrative of conventional problems experienced with tracking control for an optical memory disk, respectively.

In FIG. 15(A), a shows a non-recorded surface while b shows a recorded surface. Light reflected from the recorded surface passes through a lens LS to a light receiving unit PD.

Figure 15B:
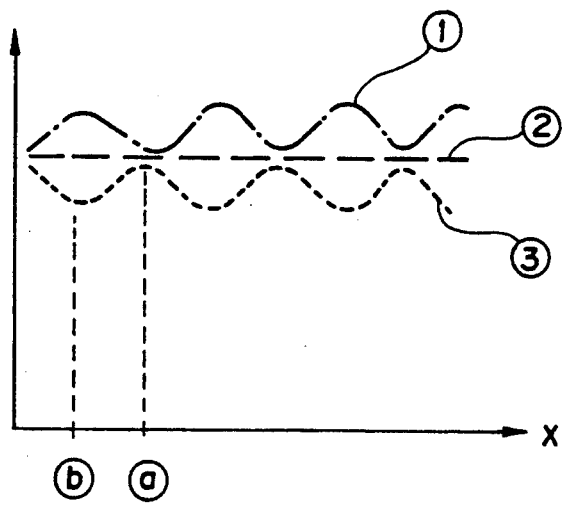

In the unrecorded region of WORM and E-DRAW optical memory disks, the intensity of light reflected from these tracks and the intensity of light reflected from the intertrack areas are almost the same as each other, i.e., there is no substantial radial contrast between the tracks and the intertrack areas, as indicated by a line ② in FIG. 15(B). Therefore, it is highly difficult to effect the spot-on-track detection in the unrecorded region according to the three beam method since the differential output signal is zero regardless of whether the main scanning spot is on track or off track.

Figure 13A:
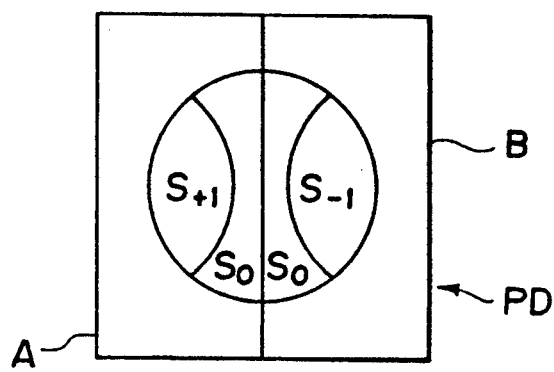
FIGS. 13(A) and 13(B) are diagrams illustrative of a light spot offset in a photodetector according to the push pull method, respectively.

The push pull method, which is effective to carry out the spot-on-track detection on such WORM and E-DRAW optical memory disks, employs a two-segment photodetector or two photodetector halves (light receiving unit) PD as shown in FIG. 13(A). When a light beam is applied as a scanning spot to an optical memory disk, it is reflected as light of a zeroth-order $L_0$ and light of positive-and negative-first orders $L_{+1}$, $L_{-1}$ due to an irregular disk surface configuration that is composed of a recording track (groove) TR and an intertrack area other than the recording track TR. The reflected light is applied to the two photodetector halves PD in three areas, i.e., the first area $S_0$ where the zeroth-order light is applied, the second area $S_{+1}$ where the zeroth-order light $L_0$ and the positive-first-order light $L_{+1}$ are applied as diffracted, and the third area $S_{-1}$ where the zeroth-order light $L_0$ and the negative-firss-order light $L_{-1}$ are applied as diffracted.

The two photodetector halves PD have respective photodetector surfaces A, B whose output terminals are connected to the respective input terminals of a subtracter, which produces a differential output signal or tracking error signal representative of the difference between output signals from the photodetector halves PD. When the scanning spot is on track, the intensity of light applied to the second area $S_{+1}$ and the intensity of light applied to the third area $S_{-1}$ are equal to each other, and hence the differential output signal is zero. When the scanning spot is off track, the intensity of light applied to the second area $S_{+1}$ and the intensity of light applied to the third area $S_{-1}$ are different from each other, and hence the differential output signal is of a positive or negative value. Consequently, the push pull method is capable of carrying out the spot-on-track detection as with the three beam method.

Figure 13B:
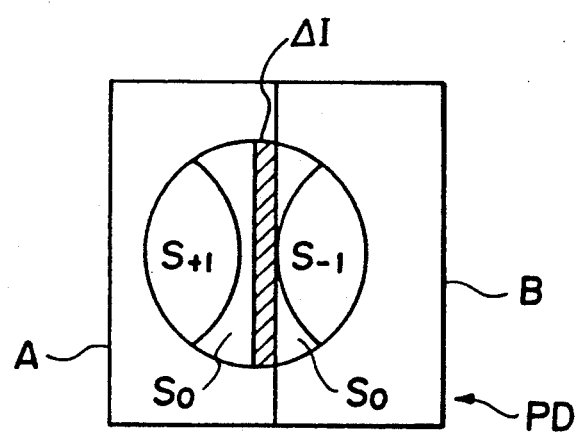
Figure 14A:
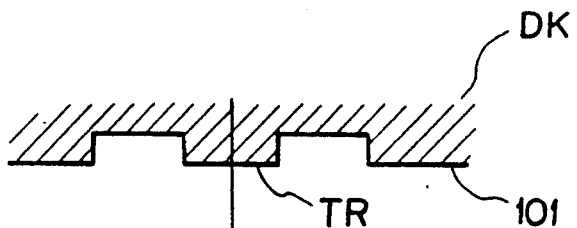
FIG. 14(A-B) is a diagram illustrative of a light spot offset in a photodetector according to the push pull method.
Figure 14B:
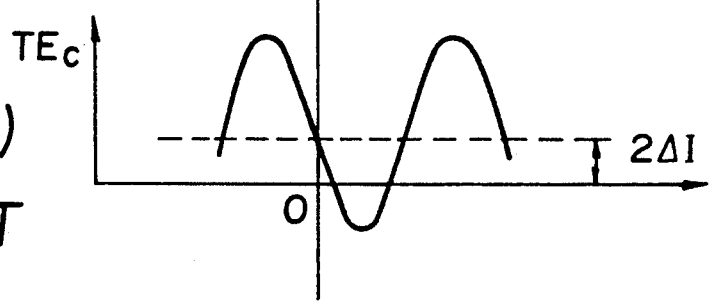

However, if the optical memory disk is radially inclined or the lens of the optical system in the optical pickup is displaced off the optical axis, then a light spot offset ΔI (see FIG. 13(B)) occurs on the photodetector according to the radial push pull method. With the light spot offset ΔI, even when the scanning spot is right on the center of the recording track TR, the produced tracking error signal is of a value 2ΔI (FIG. 14), but not zero, and the tracking servo control process is not properly performed.

EMBODIMENT

Now, preferred embodiments of the present invention will be described below with reference to the drawings.

Figure 1:
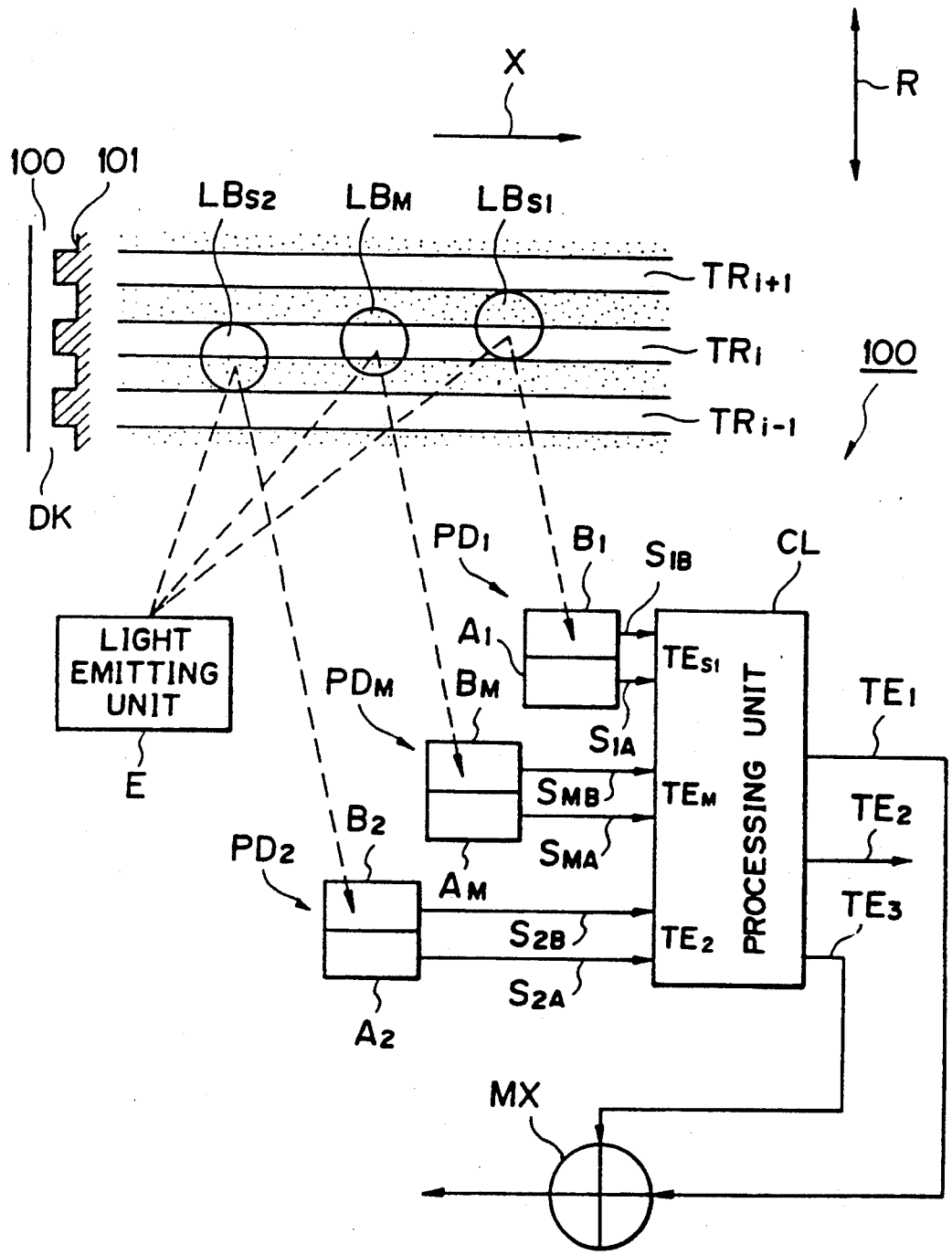
FIG. 1 is a schematic block diagram of a light spot position detector according to an embodiment of the present invention.

FIG. 1 shows a light spot position detector 100 according to a first embodiment of the present invention. The light spot position detector 100 detects whether a light spot is present on the axis (center line) of a recording track or not, based on a light beam reflected from the signal recording surface of an optical disk DK such as an optical memory disk. The optical disk DK has a substrate 100 and a recording surface 101. Two arrows X and R indicates the direction of travel of optical beams and the radial direction of the disk DK, respectively.

The light spot position detector 100 has a light emitting unit E for applying, to the signal recording surface 101, a first light spot $LB_M$, a second light spot $LB_{S1}$ spaced forwardly from the first light spot $LB_M$ axially along recording tracks TR and also spaced radially from the first spot $LB_M$ in a direction normal to the recording tracks TR (toward an inner track $TR_{i+1}$ adjacent to a target track $TR_i$), and a third light spot $LB_{S2}$ spaced rearwardly from the first light spot $LB_M$ axially along recording tracks TR and also spaced radially from the first spot $LB_M$ in a direction normal to the recording tracks TR (toward an outward track $TR_{i-1}$ adjacent to the target track $TR_i$). The light spot position detector 100 also has a first photodetector unit $PD_M$ having two photodetector surfaces $A_M$, $B_M$ for photoelectrically converting a light beam reflected from the first light spot $LB_M$ into an electric signal, a second photodetector unit $PD_1$ having two photodetector surfaces $A_1$, $B_1$ for photoelectrically converting a light beam reflected from the second light spot $LB_{S1}$ into an electric signal, and a third photodetector unit $PD_2$ having two photodetector surfaces $A_2$, $B_2$ for photoelectrically converting a light beam reflected from the third light spot $LB_{S2}$ into an electric signal.

The light spot position detector 100 further includes a processing unit CL for calculating a first differential output signal $TE_M$ indicative of the difference between output signals $S_{MA}$, $S_{MB}$ from the photodetector surfaces $A_M$, $B_M$ of the first photodetector unit $PD_M$, a second differential output signal $TE_{S1}$ indicative of the difference between output signals $S_{1A}$, $S_{1B}$ from the photodetector surfaces $A_1$, $B_1$ of the second photodetector unit $PD_1$, a third differential output signal $TE_{S2}$ indicative of the difference between output signals $S_{2A}$, $S_{2B}$ from the photodetector surfaces $A_2$, $B_2$ of the third photodetector unit $PD_2$. The processing unit further calculates a first light spot position signal $TE_1$ indicative of the difference between the sum of the second and third differential output signals $TE_{S1}$, $TE_{S2}$ as multiplied by a real number K/2 {$(K/2) \times (TE_{S1} + TE_{S2})$} and the first differential output signal $TE_M$, a second light spot position signal $TE_2$ indicative of the difference between the second and third differential output signals $TE_{S1}$, $TE_{S2}$, a second sum output signal $S_{S1}$ indicative of the sum of the output signals $S_{1A}$, $S_{1B}$ from the photodetector surfaces $A_1$, $B_1$ of the second photodetector unit $PD_1$, a third sum output signal $S_{S2}$ indicative of the sum of the output signals $S_{2A}$, $S_{2B}$ from the photodetector surfaces $A_2$, $B_2$ of the third photodetector unit $PD_2$, and a third light spot position signal $TE_3$ indicative of the difference between the second and third sum output signals $S_{S1}$, $S_{S2}$. The light spot position detector 100 also has a mixing unit MX for mixing the first and third light spot position signals $TE_1$, $TE_3$.

The light spot position detector 100 shown in FIG. 1 offers both the advantages of the first light spot position signal $TE_1$ that is calculated from the three push pull output signals according to the push pull method, and the third light spot position signal $TE_3$ that is produced as a tracking error signal according to the three beam method. More specifically, the first light spot position signal $TE_1$ cancels out spot offsets produced in the push pull output signals due to a lens offset or a disk inclination. Though each of the push pull output signals is affected by the spot offset, since the spot offsets are canceled out by the first light spot position signal $TE_1$, the first light spot position signal $TE_1$ is effective to carry out the spot-on-track detection even if there is no substantial radial contrast between the tracks and the intertrack areas, as indicated by the line ② in FIG. 15(B). The third light spot position signal $TE_3$ is ineffective to perform the spot-on-track detection if there is no substantial radial contrast as indicated by the line ② in FIG. 15(B). However, the third light spot position signal $TE_3$ is not affected by the spot offset as it is not produced according to the push pull method. Consequently, an accurate tracking servo process can be performed based on a tracking error signal that is produced by mixing the first and third light spot position signals $TE_1$, $TE_3$ at a suitable ratio.

Figure 2:
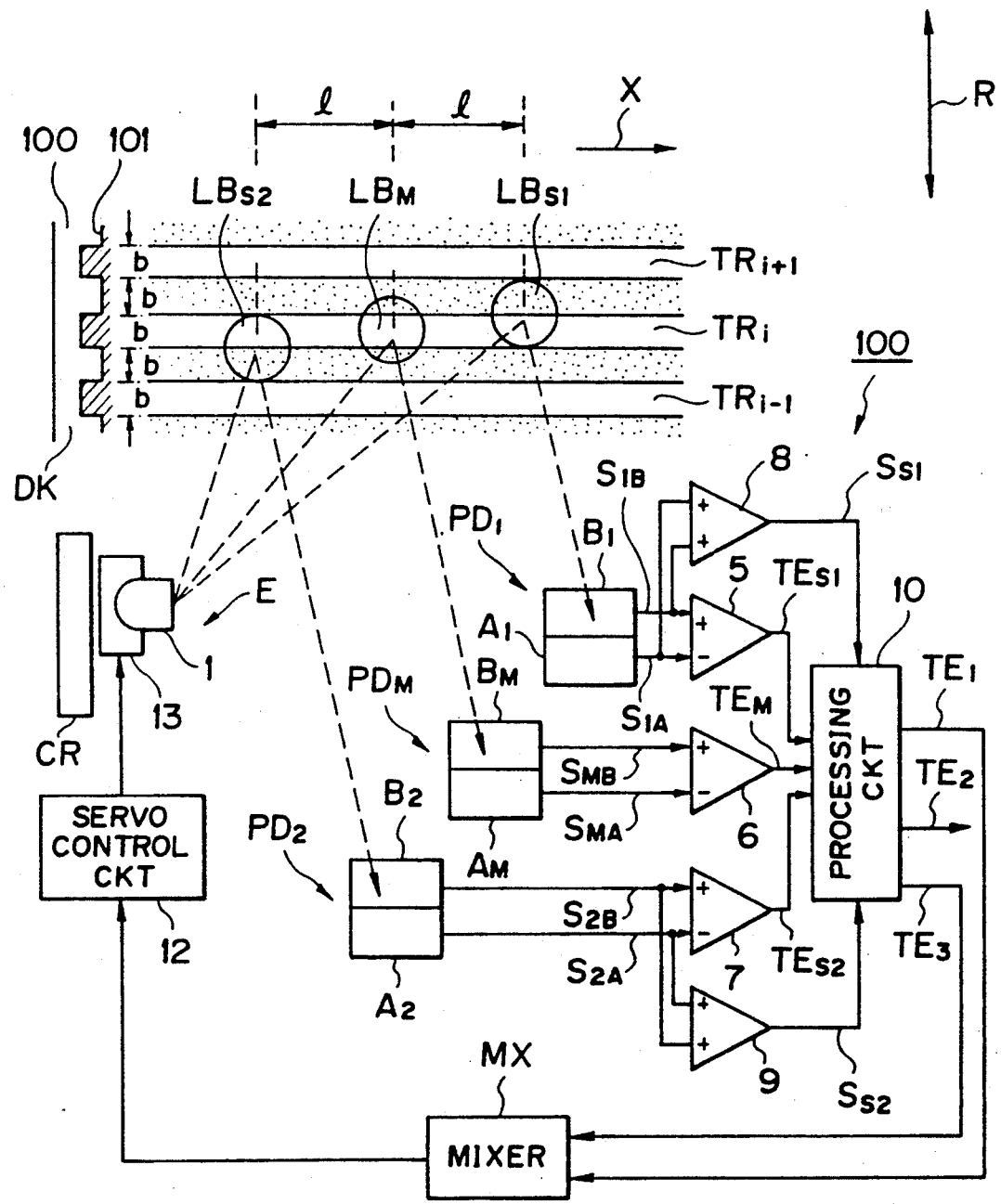
FIG. 2 is a detailed block diagram of the light spot position detector shown in FIG. 1.

FIG. 2 shows the detailed light spot position detector shown in FIG. 1. The light spot position detector 100 is part of a tracking servo control device that comprises a laser beam source 1 as the light-emitting means E, the two-segment photodetector $PD_M$ as a first photodetector means, the two-segment photodetector $PD_1$ as a second photodetector means, the two-segment photodetector $PD_2$ as a third photodetector means, subtracters 5, 6, 7, adders 8, 9, the processing circuit 10, the mixer MX, a servo control circuit 12, and an actuator 13. The subtracters 5, 6, 7, the adders 8, 9, and the processing circuit 10 jointly serve as a processing means. The mixer MX serves as a mixing means. The laser beam source 1, the two-segment photodetectors $PD_1$, $PD_M$, $PD_2$ the subtracters 5, 6, 7, the adders 8, 9, the processing circuit 10, and the mixer 11 jointly serve as the light spot position detector.

The laser beam source 1 comprises various optical components (not shown) including a laser diode, lenses, a beam splitter and others, and applies light spots on recording tracks TR on the signal recording surface of an optical memory disk. The lenses of the laser beam source 1 include an objective lens which is positionally adjustable by the actuator 13. The actuator 13 may usually comprise an electromagnetic coil, for example. The laser beam source 1 itself can be moved radially across the optical memory disk by a carriage CR.

Each of the light spots has a radius of the width b of a track TR. Each of the recording tracks TR and each of the intertrack areas has a width of b. The laser beam source 1 applies a main light spot $LB_M$ as a first light spot to a target recording track (groove) $TR_i$ on its center line. The laser beam source 1 also applies a leading light spot $LB_{S1}$ as a second light spot spaced forwardly from the main light spot $LB_M$ by a distance l along the track center line and also spaced radially from the main light spot $LB_M$ toward an adjacent recording track $TR_{i+1}$ by a distance b/2 (which is about a quarter of the interaxial distance between two adjacent recording tracks) in a direction normal to the track center line. Therefore, the outer edge of the leading light spot $LB_{S1}$ is not superimposed on the adjacent recording track $TR_{i+1}$. The laser beam source 1 also applies a trailing light spot $LB_{S2}$ as a third light spot spaced rearwardly from the main light spot $LB_M$ by a distance l along the track center line and also spaced radially from the main light spot $LB_M$ toward an adjacent recording track $TR_{i-1}$ by a distance b/2 in a direction normal to the track center line. Therefore, the outer edge of the trailing light spot $LB_{S2}$ is not superimposed on the adjacent recording track $TR_{i-1}$.

The two-segment photodetector $PD_M$ has two photodetector surfaces $A_M$, $B_M$ that are divided from each other by a parting line parallel to the track center line. The photodetector surface $A_M$ has an output terminal connected to a positive input terminal of the subtracter 6, and the photodetector surface $B_M$ has an output terminal connected to a negative input terminal of the subtracter 6. The two-segment photodetector $PD_1$ has two photodetector surfaces $A_1$, $B_1$ that are divided from each other by a parting line parallel to the track center line. The photodetector surface $A_1$ has an output terminal connected to a negative input terminal of the subtracter 5, and the photodetector surface $B_1$ has an output terminal connected to a positive input terminal of the subtracter 5. The two-segment photodetector $PD_2$ has two photodetector surfaces $A_2$, $B_2$ that are divided from each other by a parting line parallel to the track center line. The photodetector surface $A_2$ has an output terminal connected to a negative input terminal of the subtracter 7, and the photodetector surface $B_2$ has an output terminal connected to a positive input terminal of the subtracter 7. The subtracters 5, 6, 7 have respective output terminals connected to input terminals of the processing circuit 10. The output terminals of the photodetector surfaces $A_1$, $B_1$ are also connected to two positive input terminals, respectively, of the adder 8. The output terminals of the photodetector surfaces $A_2$, $B_2$ are also connected to two positive input terminals, respectively, of the adder 9. The adders 8, 9 have respective output terminals connected to input terminals of the processing circuit 10.

Figure 3:
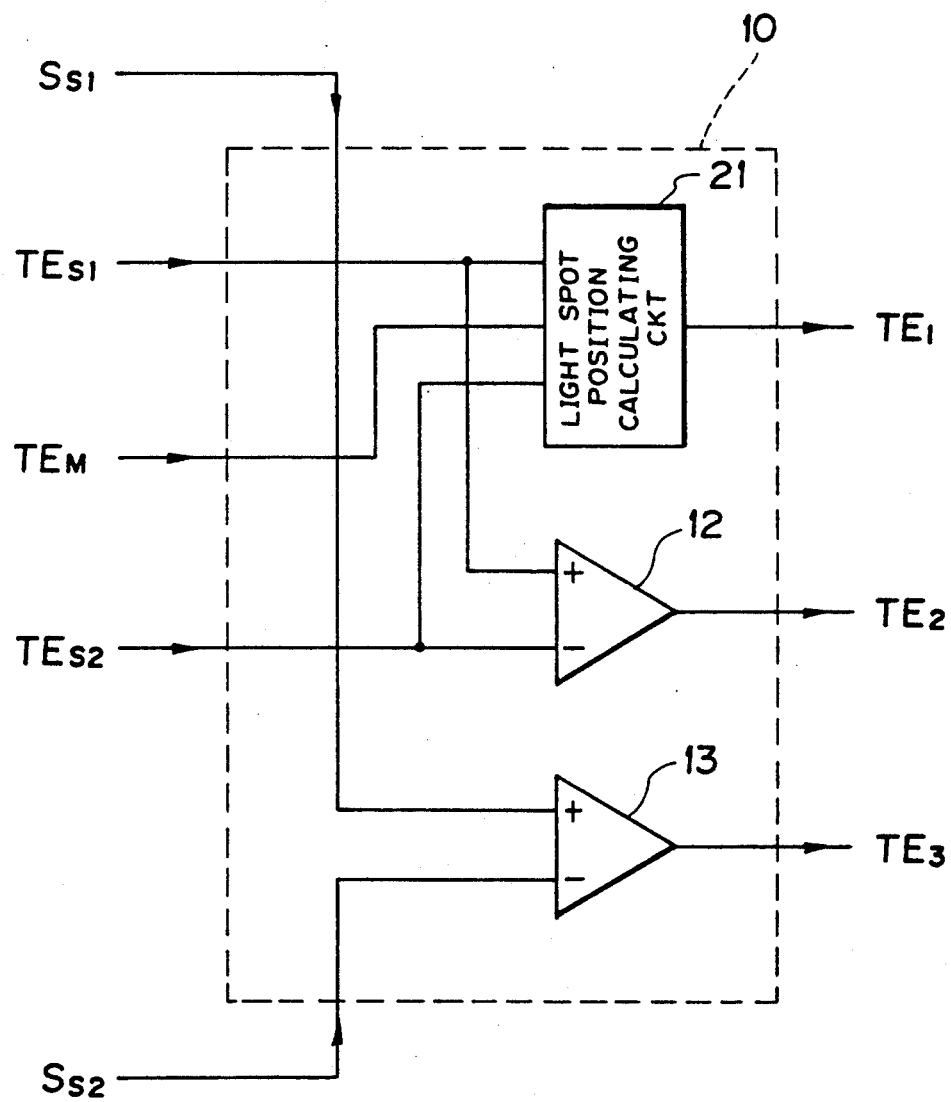
FIG. 3 is a detailed block diagram of a processing unit in the light spot position detector shown in FIG. 2.

As shown in FIG. 3, the processing circuit 10 comprises a light spot position calculating circuit 21 for calculating a first light spot position signal $TE_1$ based on a first differential output signal $TE_M$ from the subtracter 6, a second differential output signal $TE_{S1}$ from the subtracter 5, and a third differential output signal $TE_{S2}$ from the subtracter 7, a subtracter 12 for producing a second light spot position signal $TE_2$ by subtracting the third differential output signal $TE_{S2}$ from the second differential output signal $TE_{S1}$, and a subtracter 13 for producing a third light spot position signal $TE_3$ by subtracting a third sum output signal $S_{S2}$ by the adder 9 from a second sum output signal $S_{S1}$ by the adder 8.

As shown in FIG. 4, the light spot position calculating circuit 21 comprises an adder 14 for producing a sum output signal indicative of the sum of the second differential output signal $TE_{S1}$ and the third differential output signal $TE_{S2}$, a multiplier 15 for multiplying the sum output signal from the adder 14 by a real number ($=K/2$), and a subtracter 16 for producing the first light spot position signal $TE_1$ by subtracting an output signal by the multiplier 15 from the first differential output signal $TE_M$. K of the real number K/2 represents the ratio between the intensity of light reflected from the main light spot $LB_M$ and the intensity of light reflected from the leading light spot $LB_{S1}$ or the trailing light spot $LB_{S2}$.

Operation of the tracking servo control device 100 will be described below with reference to FIGS. 2 through 7.

The light reflected from the main light spot $LB_M$ is detected by the two-segment photodetector $PD_M$ and photoelectrically converted thereby. The photodetector surface $A_M$ applies an output signal $S_{MA}$ to the subtracter 6, and the photodetector surface $B_M$ applies an output signal $S_{MB}$ to the subtracter 6. The subtracter 6 produces the first differential output signal $TE_M$ as follows:

$$TE_M = S_{MB} - S_{MA}.$$

Figure 6A:
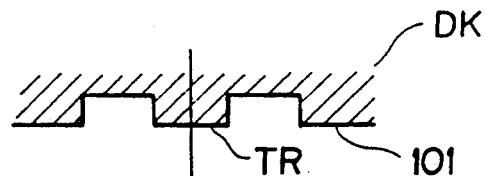
Figure 6B:
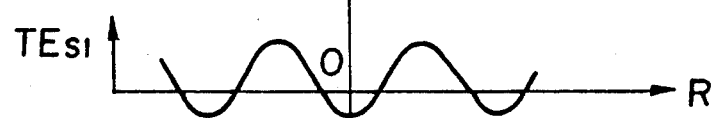

FIG. 6(B) shows the first differential output signal $TE_M$ (push pull output signal) that is plotted on a vertical axis against a radial distance represented by a R-axis normal to the track center line. The first differential output signal $TE_M$ is indicated by a sine curve, and has a signal offset $2\Delta I$ in FIG. 6(B).

The light reflected from the leading light spot $LB_{S1}$ is detected by the two-segment photodetector $PD_1$ and photoelectrically converted thereby. The photodetector surface $A_1$ applies an output signal $S_{1A}$ to the subtracter 5, and the photodetector surface $B_1$ applies an output signal $S_{1B}$ to the subtracter 5. The subtracter 5 produces the second differential output signal $TE_{S1}$ as follows:

$$TE_{S1} = S_{1B} - S_{1A}.$$

FIG. 6(A) shows the second differential output signal $TE_{S1}$ (push pull output signal) that is plotted on a vertical axis against a radial distance represented by an R-axis normal to the track center line. The second differential output signal $TE_{S1}$ is indicated by a sine curve, but is out of phase with the first differential output signal $TE_M$.

The light reflected from the trailing light spot $LB_{S2}$ is detected by the two-segment photodetector $PD_2$ and photoelectrically converted thereby. The photodetector surface $A_2$ applies an output signal $S_{2A}$ to the subtracter 7, and the photodetector surface $B_2$ applies an output signal $S_{2B}$ to the subtracter 7. The subtracter 7 produces the third differential output signal $TE_{S2}$ as follows:

$$TE_{S2} = S_{2B} - S_{2A}.$$

Figure 6C:
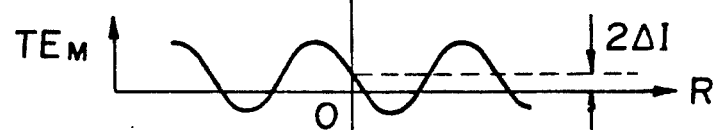
Figure 6D:
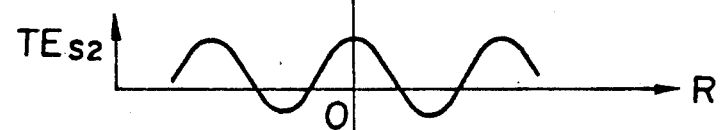
Figure 6E:
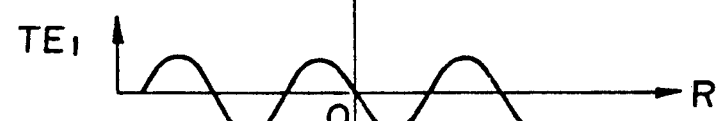

FIG. 6(C) shows at (D) the third differential output signal $TE_{S2}$ (push pull output signal) that is plotted on a vertical axis against a radial distance represented by the R-axis normal to the track center line. The second differential output signal $TE_{S2}$ is indicated by a sine curve, but is out of phase with the first differential output signal $TE_M$. As can be seen from FIGS. 6(B) and (D), when the light spots $LB_M$, $LB_{S1}$, $LB_{S2}$ are applied to the optical memory disk, the produced second and third differential output signals $TE_{S1}$, $TE_{S2}$ are out of phase by 180° with each other. Then, the processing circuit 10 calculates the first and second light spot position signals $TE_1$, $TE_2$ according to the following equations:

$$TE_1 = TE_M - K/2 \times (TE_{S1} + TE_{S2})$$

$$TE_2 = TE_{S1} - TE_{S2}.$$

The first and second light spot position signals $TE_1$, $TE_2$ have respective waveforms as shown in FIGS. 6 (E) and (F), respectively. It can be seen from FIGS. 6 (E) and (F) that the signal offset $2\Delta I$ is eliminated from the first light spot position signal $TE_1$. Since the second and third differential output signals $TE_{S1}$, $TE_{S2}$ are 180° out of phase by 180° with each other, the second light spot position signal $TE_2$ is not zero, and has a maximum negative value when the main light spot $LB_M$ is on track. A track jump control process can be effected by searching the condition in which $TE_1 = 0$ and $TE_2 = N$ ($N < 0$).

The adder 8 calculates the second sum output signal $S_{S1}$ from the output signals $S_{1A}$, $S_{1B}$ from the two-segment photodetector $PD_1$ as follows:

$$S_{S1} = S_{1A} + S_{1B}.$$

The adder 9 calculates the third sum output signal $S_{S2}$ from the output signals $S_{2A}$, $S_{2B}$ from the two-segment photodetector $PD_2$ as follows:

$$S_{S2} = S_{2A} + S_{2B}.$$

The processing circuit 10 subtracts the third sum output signal $S_{S2}$ from the second sum output signal $S_{S1}$ to produce the third light position output signal $TE_3$, as follows:

$$TE_3 = S_{S1} - S_{S2}$$

Figure 7A:
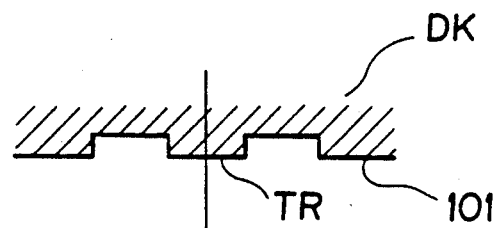
Figure 7B:
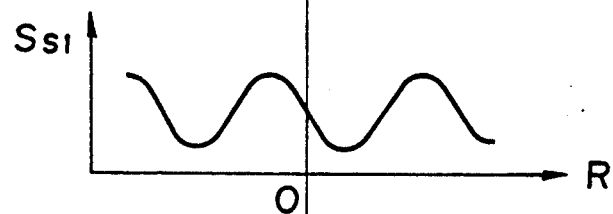
Figure 7C:
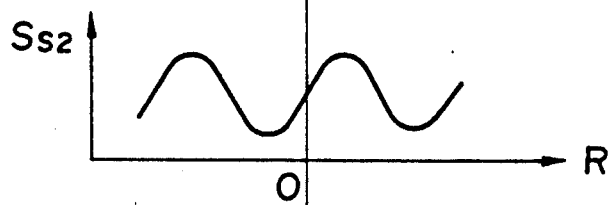
Figure 7D:
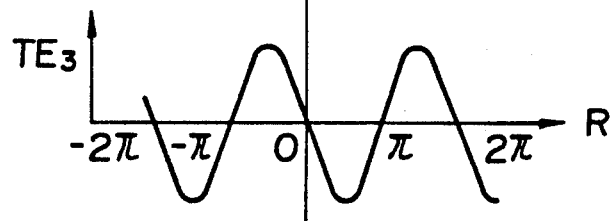

The signals $S_{S1}$, $S_{S2}$, $TE_3$ have respective waveforms as shown in FIGS. 7(B), (C), and (D), respectively. It can be seen from FIG. 7 that the tracking servo control process can also be carried out by employing the third light spot position signal $TE_3$.

Then, the mixer 11 mixes the first and third light spot position signals $TE_1$, $TE_3$ at a desired ratio, thus providing a tracking error signal which has both advantages of these signals $TE_1$, $TE_3$. The tracking error signal from the mixer 11 is then fed back to the actuator 13 through the servo control circuit 12 for controlling the position of the laser beam source 1 with respect to the tracks.

OTHER EMBODIMENTS

Figure 8:
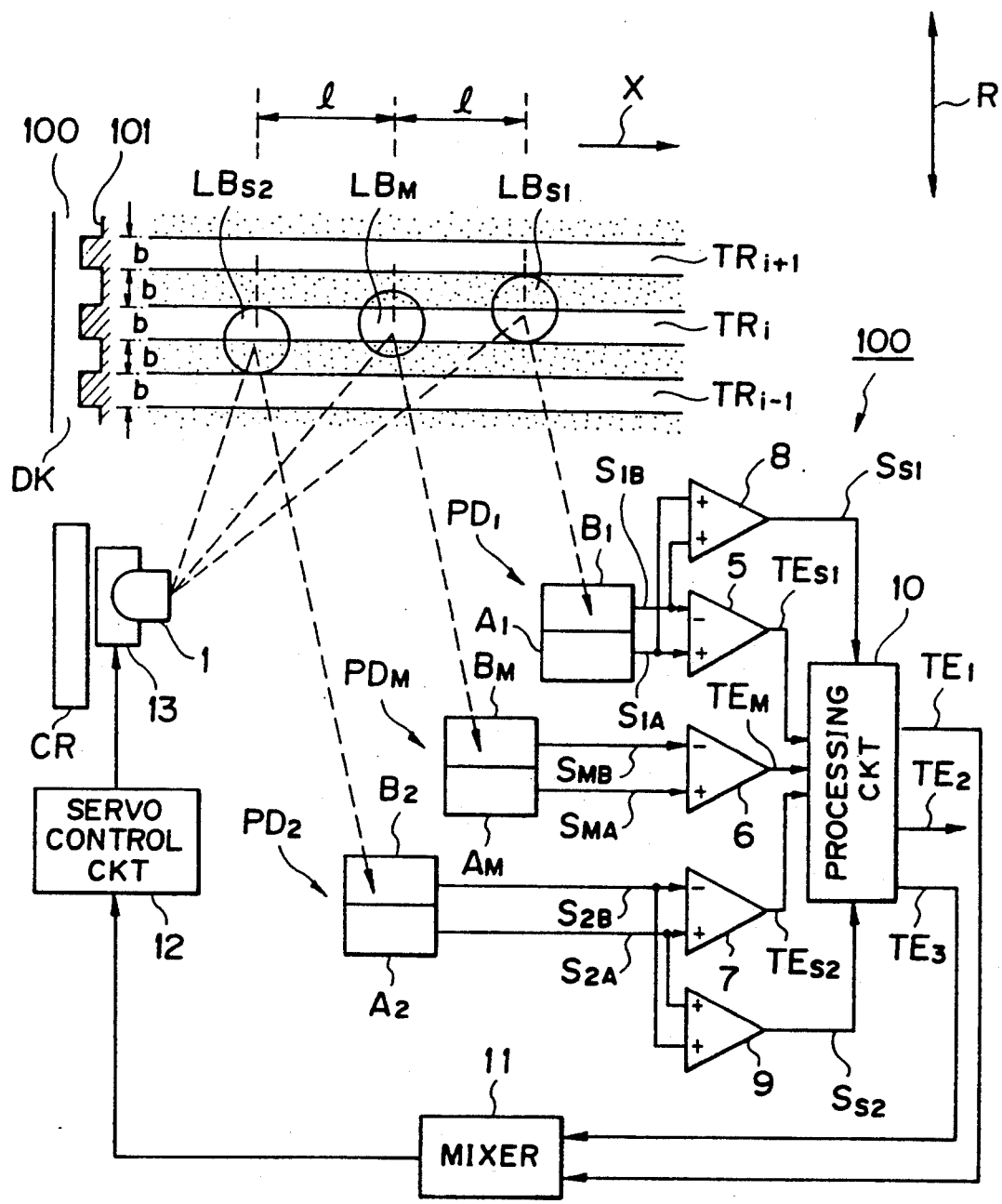
FIG. 8 is a block diagram of a light spot position detector according to another embodiment of the present invention.
Figure 9:
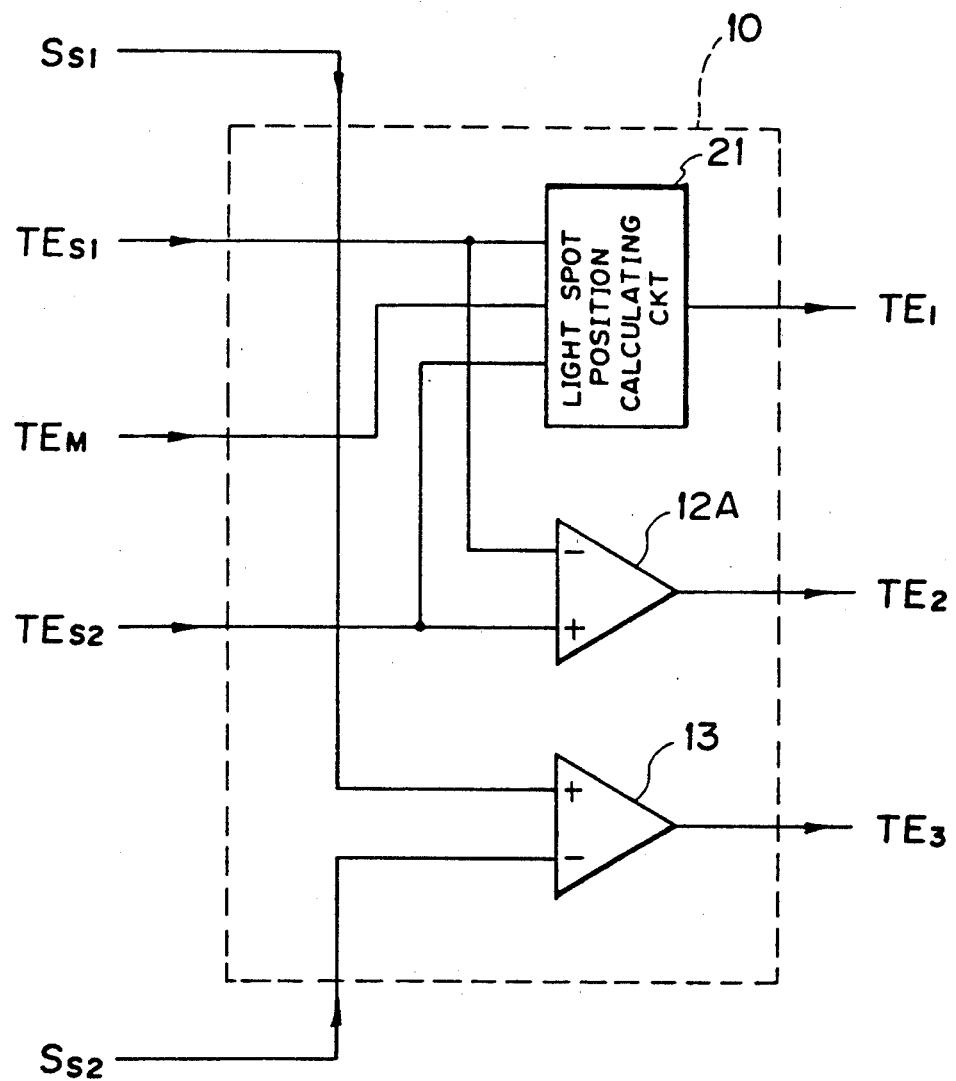
FIG. 9 is a detailed block diagram of a processing unit in the light spot position detector shown in FIG. 8.

In the above embodiment, the substracters 5, 6, 7 substract the output signals $S_{MA}$, $S_{1A}$, $S_{2A}$ from the output signals $S_{MB}$, $S_{1B}$, $S_{2B}$, respectively. However, according to another embodiment shown in FIG. 8, the output signals $S_{MB}$, $S_{1B}$, $S_{2B}$ are substracted from the output signals $S_{MA}$, $S_{1A}$, $S_{2A}$, respectively, by subtactors 5, 6, 7. In another embodiment, the second light spot position signal $TE_2$ is produced by a subtracter 12A (see FIG. 9) according to the following equation:

$$TE_2 = TE_{S2} - TE_{S1}$$

Figure 6F:
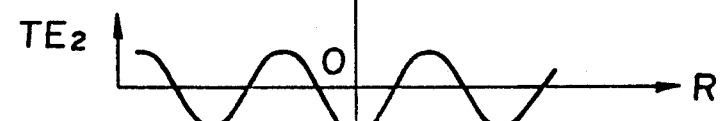

A zero crossing is reached when the second light spot position signal $TE_2$ is of a positive maximum value as shown in FIG. 10(F). That is, the signal $TE_2$ in FIG. 6(F) is out of phase by 180° from the signal $TE_2$ in FIG. 10(F). That is, the signal $TE_2$ in FIG. 6(F) is out of phase by 180° from the signal $TE_2$ in FIG. 10(F).

Figure 11:
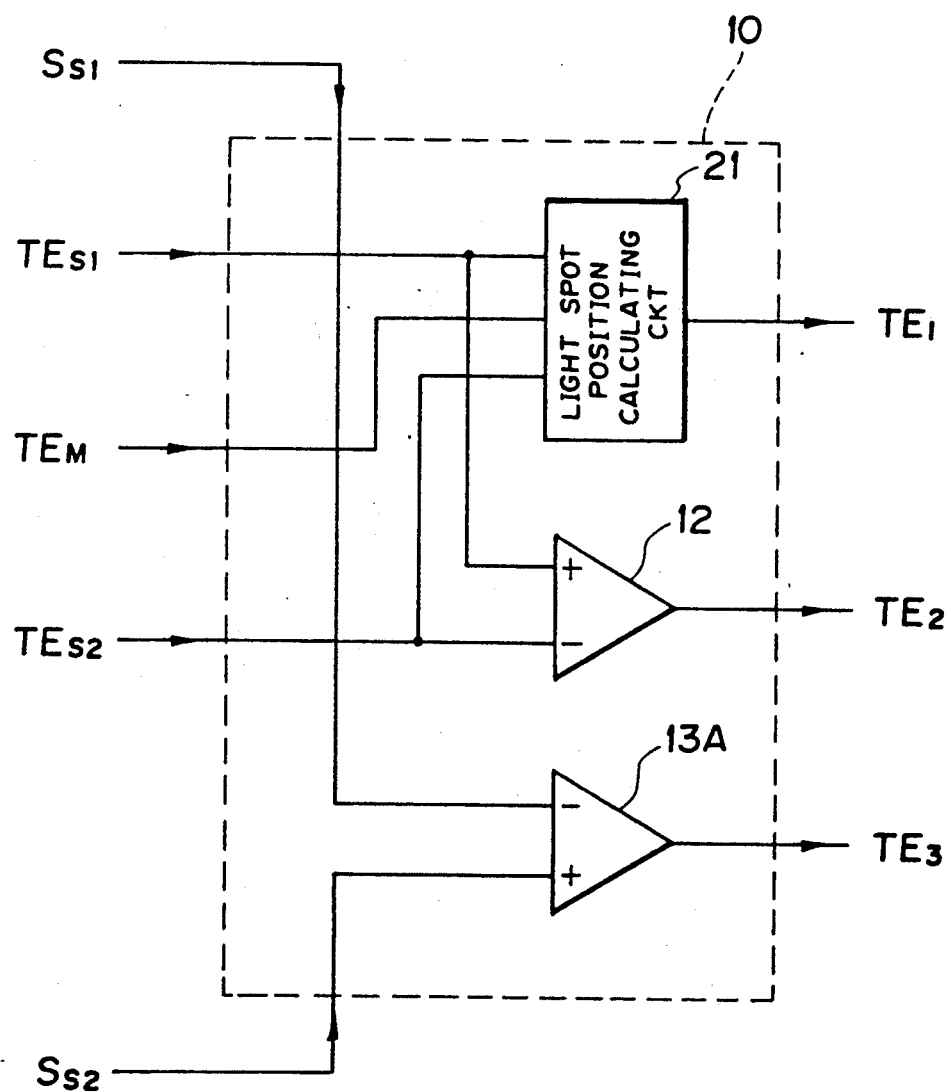
FIG. 11 is a detailed block diagram of a processing unit according to still another embodiment of the present invention.

As shown in FIG. 11, the third light spot position signal $TE_3$ may be produced by a subtracter 13A according to the following equation:

$$TE_3 = S_{S2} - S_{S1}.$$

Figure 12:
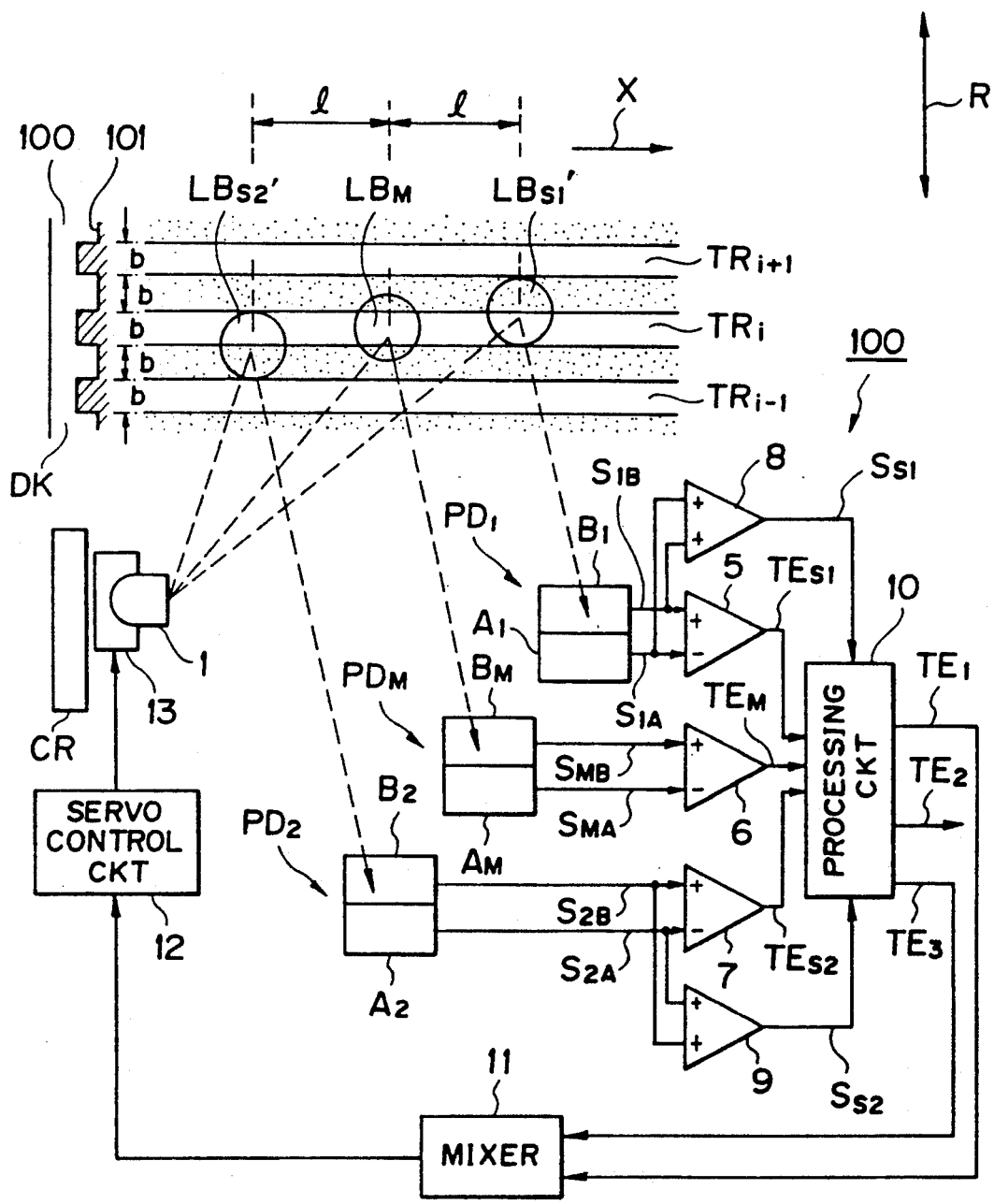
FIG. 12 is a block diagram of a light spot position detector according to a still another embodiment of the present invention.

In the above embodiments, the leading and trailing light spots are not projected onto the adjacent recording tracks. However, as shown in FIG. 12, leading and trailing light spots $LB_{S1'}$, $LB_{S2'}$ may be projected so as to be superimposed on the adjacent recording tracks. That is, the radius of each of three spot $LB_M$, $LB_{S1'}$, $LB_{S2'}$ is larger than the width b of the track. The arrangement shown in FIG. 12 is also effective to produce the first and third light spot position signals $TE_1$, $TE_3$.

According to this invention, in the case that the beams are moved along the non-recorded grooves where no pit is formed on a WORM disk, the beams can be correctly moved on the grooves because of the signal $TE_1$ as a control signal. In addition, in the case that the beams are moved along the recorded grooves where pits are formed on the WORM disk, a tracking error signal for reliably eliminating the offset can be obtained because of the signal $TE_3$ as a control signal.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A light spot position detector for detecting whether a light spot is present on a center line of a recording track or not based on a light beam reflected from a signal recording surface of an optical disk, said light spot position detector comprising:

light-emitting means for applying, to the signal recording surface of the optical disk, a first light spot, a second light spot spaced forwardly from said first light spot by a distance along the center line of the recording track and spaced radially from said first light spot by a distance in a direction perpendicular to the center line of the recording track, and a third light spot spaced rearwardly from said first light spot by a distance along the center line of the recording track and spaced radially from said first light spot by a distance in a direction perpendicular to the center line of the recording track;

first photodetector means having two divided photodetector surfaces, for photoelectrically converting a light beam reflected from said first light spot into an electric signal;

second photodetector means having two divided photodetector surfaces, for photoelectrically converting a light beam reflected from said second light spot into an electric signal;

third photodetector means having two divided photodetector surfaces, for photoelectrically converting a light beam reflected from said third light spot into an electric signal;

processing means for calculating a first differential output signal representing a difference between output signals from the photodetector surfaces of said first photodetector means, calculating a second differential output signal representing a difference between output signals from the photodetector surfaces of said second photodetector means, calculating a third differential output signal representing a difference between output signals from the photodetector surfaces of said third photodetector means, producing a first light spot position signal representing a difference between a multiple of the sum of said second and third differential output signals and a real number, and said first differential output signal, producing a second light spot position signal representing a difference between said second and third differential output signals, calculating a second sum output signal representing the sum of the output signals from the photodetector surfaces of said second photodetector means, calculating a third sum output signal representing the sum of the output signals from the photodetector surfaces of said third photodetector means, and producing a third light spot position signal representing a difference between said second and third sum output signals; and mixing means for mixing said first and third light spot position signals with each other.

2. A light spot position detector according to claim 1, wherein said processing means comprises:

a first subtracter for calculating a difference between the output signals from the photodetector surfaces of said first photodetector means thereby to produce said first differential output signal;

a second subtracter for calculating a difference between the output signals from the photodetector surfaces of said second photodetector means thereby to produce said second differential output signal;

a third subtracter for calculating a difference between the output signals from the photodetector surfaces of said third photodetector means thereby to produce said third differential output signal;

a first adder for calculating a sum of said second differential output signal from said second subtracter and said third differential output signal from said third subtracter;

a multiplier for multiplying said sum calculated by said first adder by a real number;

a fourth subtracter for calculating a difference between an output signal from said multiplier and said first differential output signal thereby to produce said first light spot position signal;

a fifth subtracter for calculating a difference between said second differential output signal from said second subtracter and said third differential output signal from said third subtracter thereby to produce said second light spot position signal;

a second adder for adding the output signals from the photodetector surfaces of said second photodetector means thereby to produce said second sum output signal;

a third adder for adding the output signals from the photodetector surfaces of said third photodetector means thereby to produce said third sum output signal; and a sixth subtracter for calculating the difference between said second and third sum output signals thereby to produce said third light spot position signal.

3. A light spot position detector according to claim 2, wherein said first photodetector means has first and second photodetector surfaces as said photodoctor surfaces, respectively, thereof, said second photodetector means has third and fourth photodetector surfaces as said photodetector surfaces, respectively, thereof, and said third photodetector means has fifth and sixth photodetector surfaces as said photodetector surfaces, respectively, thereof, an arrangement being such that said first subtracter produces said first differential output signal by subtracting an output signal from said second photodetector surface from an output signal from said first photodetector surface, said second subtracter produces said second differential output signal by subtracting an output signal from said fourth photodetector surface from an output signal from said third photodetector surface, said third subtracter produces said third differential output signal by subtracting an output signal from said sixth photodetector surface from an output signal from said fifth photodetector surface, and said fifth subtracter produces said second light spot position signal by subtracting said third differential output signal from said second differential output signal.

4. A light spot position detector according to claim 2, wherein said first photodetector means has first and second photodetector surfaces as said photodetector surfaces, respectively, thereof, said second photodetector means has third and fourth photodetector surfaces as said photodetector surfaces, respectively, thereof, and said third photodetector means has fifth and sixth photodetector surfaces as said photodetector surfaces, respectively, thereof, an arrangement being such that said first subtracter produces said first differential output signal by subtracting an output signal from said first photodetector surface from an output signal from said second photodetector surface, said second subtracter produces said second differential output signal by subtracting an output signal from said third photodetector surface from an output signal from said fourth photodetector surface, said third subtracter produces said third differential output signal by subtracting an output signal from said fifth photodetector surface from an output signal from said sixth photodetector surface, and said fifth subtracter produces said second light spot position signal by subtracting said second differential output signal from said third differential output signal.

5. A light spot position detector according to claim 2, wherein said sixth subtracter produces said third light spot position signal by subtracting said third sum output signal from said second sum output signal.

6. A light spot position detector according to claim 2, wherein said sixth subtracter produces said third light spot position signal by subtracting said second sum output signal from said third sum output signal.

7. A light spot position detector according to claim 1, wherein said distance in a radial direction of the disk between two light spots is approximately a quarter of an interaxial distance between adjacent tracks on the optical disk.

8. A light spot position detector according to claim 1, wherein a radius of each spot is equal to a width of a track.

9. A light spot position detector according to claim 1, wherein a radius of each spot is larger than a width of a track.

* * * * *